(12) United States Patent
Christensen et al.

(10) Patent No.: US 10,848,541 B2
(45) Date of Patent: *Nov. 24, 2020

(54) METHOD AND SYSTEM FOR FACILITATING THE INTEGRATION OF A PLURALITY OF DISSIMILAR SYSTEMS

(71) Applicant: Irving S. Rappaport, Palo Alto, CA (US)

(72) Inventors: Mitchell T. Christensen, Livermore, CA (US); Danny R. Sojka, Carmel, CA (US)

(73) Assignee: Irving S. Rappaport, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/732,851

(22) Filed: Jan. 8, 2018

(65) Prior Publication Data
US 2020/0028887 A1    Jan. 23, 2020

Related U.S. Application Data

(63) Continuation of application No. 14/544,556, filed on Jan. 22, 2015, now Pat. No. 9,912,722, which is a
(Continued)

(51) Int. Cl.
| H04L 29/08 | (2006.01) |
| H04L 29/06 | (2006.01) |
| H04L 12/24 | (2006.01) |

(52) U.S. Cl.
CPC .......... *H04L 67/02* (2013.01); *H04L 41/022* (2013.01); *H04L 41/0266* (2013.01); *H04L 63/0823* (2013.01); *H04L 67/10* (2013.01); *H04L 67/14* (2013.01); *H04L 69/329* (2013.01); *H04L 41/0273* (2013.01)

(58) Field of Classification Search
CPC ......... H04L 67/02; H04L 67/10; H04L 67/14; H04L 41/022; H04L 41/0266; H04L 63/08; H04L 69/329; H04L 41/0273
See application file for complete search history.

(56) References Cited

U.S. PATENT DOCUMENTS

| 4,951,196 A | 8/1990 | Jackson ......................... 705/37 |
| 5,557,780 A | 9/1996 | Edwards et al. ............... 703/27 |

(Continued)

FOREIGN PATENT DOCUMENTS

EP    1016989 A2    7/2000

OTHER PUBLICATIONS

Wilhelm Hasselbring, "Information Systems Integartion", Communications of the ACM, Jun. 2000,p.32-39, vol. 43 No. 6, ACM, USA.
(Continued)

*Primary Examiner* — Todd L Barker
(74) *Attorney, Agent, or Firm* — Irving S. Rappaport

(57) ABSTRACT

The present invention is related to a method and system for facilitating the integration of a plurality of dissimilar systems by allowing networks of integration framework installations and/or other compatible B2B servers to inter-operate across corporate enterprise boundaries to integrate the disparate systems operating within each corporate enterprise.

18 Claims, 10 Drawing Sheets

Client/Server IF MOM
based Remote Message
Distribution
(unidirectional)

Related U.S. Application Data continuation of application No. 12/804,782, filed on Jul. 30, 2010, now Pat. No. 8,972,599, which is a continuation of application No. 11/523,078, filed on Sep. 19, 2006, now Pat. No. 7,797,452, which is a continuation of application No. 10/109,874, filed on Apr. 1, 2002, now Pat. No. 7,143,190.

(60) Provisional application No. 60/280,121, filed on Apr. 2, 2001.

(56) References Cited

U.S. PATENT DOCUMENTS

| | | | |
|---|---|---|---|
| 6,031,533 A | 2/2000 | Peddada et al. | 715/733 |
| 6,041,365 A | 3/2000 | Kleinerman | 719/328 |
| 6,085,243 A | 7/2000 | Fletcher et al. | 709/224 |
| 6,167,448 A * | 12/2000 | Hemphill | G06F 9/542 |
| | | | 709/217 |
| 6,260,062 B1 | 7/2001 | Davis et al. | 709/223 |
| 6,363,421 B2 | 3/2002 | Barker et al. | 709/223 |
| 6,418,400 B1 | 7/2002 | Webber | 703/22 |
| 6,711,629 B1 | 3/2004 | Christensen et al. | 710/8 |
| 6,757,739 B1 | 6/2004 | Tomm et al. | 708/236 |
| 6,772,216 B1 | 8/2004 | Ankireddipally et al. | 709/230 |
| 6,826,726 B2 | 11/2004 | Hsing et al. | 715/234 |
| 6,832,120 B1 | 12/2004 | Frank et al. | 700/85 |
| 6,959,340 B1 | 10/2005 | Najmi | 709/248 |
| 7,246,351 B2 * | 7/2007 | Bloch | G06F 8/61 |
| | | | 715/700 |
| 2002/0010741 A1 | 1/2002 | Stewart | |
| 2002/0069096 A1 * | 6/2002 | Lindoerfer | G06Q 10/04 |
| | | | 705/7.25 |
| 2002/0091533 A1 | 7/2002 | Ims et al. | 705/1 |
| 2002/0129006 A1 * | 9/2002 | Emmett | G06F 16/986 |
| 2002/0194347 A1 * | 12/2002 | Koo | G06F 9/542 |
| | | | 709/227 |
| 2003/0189593 A1 | 10/2003 | Yarvin | 715/762 |

OTHER PUBLICATIONS

Jian Yang and Mike P. Papazoglou, "Interoperation Support for Electronic Business", Communications of the ACM, Jun. 2000,p. 39-47, vol. 43 No. 6, ACM, USA.

Peter Fingar, "Component-Based Frameworks for E-Commerce", Communication of the ACM, Oct. 2000, p. 61-66, vol. 43 No. 10, ACM, USA.

* cited by examiner

Integration Framework Host Adapter

Client/Server Integration
Framework Domain
Authentication

IF Client/SMTP Server message distribution

POP3/IMAP to IF Server message distribution

METHOD AND SYSTEM FOR FACILITATING THE INTEGRATION OF A PLURALITY OF DISSIMILAR SYSTEMS

RELATED PATENT APPLICATION

This patent application is a continuation application of related U.S. non-provisional patent applications entitled "Method and System for Facilitating the Integration of a Plurality of Dissimilar Systems", Ser. No. 12/804,782, filed Jul. 30, 2010, allowed Nov. 10, 2014, "Method and System for Facilitating the Integration of a Plurality of Dissimilar Systems", Ser. No. 11/523,078 filed Sep. 19, 2006, now U.S. Pat. No. 7,797,452, "Method and System for Facilitating the Integration of a Plurality of Dissimilar Systems", Ser. No. 10/109,874 filed Apr. 1, 2002, now U.S. Pat. No. 7,143,190, and provisional patent application entitled "Method and System for Facilitating the Integration of a Plurality of Dissimilar Systems," Ser. No. 60/280,121, filed on Apr. 2, 2001.

BACKGROUND OF THE INVENTION

There are multiple models for automating a supply chain, such as the traditional point-to-point partnership supply chain automation as well as participation in, and integration with trading exchanges. Mid-market supply-chain-related applications have propagated over the last several years. The advent of Enterprise Resource Planning (ERP), Material Requirements Planning or Manufacturing Resource Planning (MRP), Customer Relationship Management (CRM), Supply Chain Management and Supply Chain Execution (SCM/SCE) and Marketplace applications (see glossary at the end of this document for more information) have contributed greatly to this explosion. For the enterprise to function successfully, tight integration between applications is imperative, albeit a considerable, and sometimes costly challenge. E-Business and the expansion of cross enterprise networks have added another level of complexity to this dilemma. Without an established method for connecting applications, custom (and typically not reusable) development work is undertaken each time two disparate systems are linked.

One of the most significant obstacles to supply chain automation is the integration of disparate systems. By it's very nature, a supply chain is a conglomerate of disparate software systems, from many different software vendors, each providing a small fraction of the capabilities of the overall supply chain. A fully optimized supply chain would require all of these systems to seamlessly interact, such that a purchase by a consumer of a finished good would be aggregated and propagated throughout the entire supply chain, resulting in the re-manufacturing and replenishment of this finished good to the supplier. The act of tying all the disparate systems within a supply chain together results in the notion of a high level, or abstract "meta-system" which governs inter-system processing of data, from start to finish.

The integration of disparate systems involves the translation of data formats and correlation of events between those two systems. Business logic provides the mapping between the two systems. Because this business logic is external to each system, an external execution environment is required to support the processing of business logic. The fundamental barriers to integrating applications are incompatible data formats (the format in which data relevant to each system is stored and accessed) and incompatible event models (the methods by which system events are invoked and carried out). The result is an impedance mismatch that prevents disparate applications from communicating and sharing information.

Both mid-sized and large companies have much to gain from automating and integrating their supply chains. Many of the existing integration solutions, however, can be rather unwieldy; licensing them is often very costly, and their resource requirements are typically extensive. Without a comprehensive integration solution, however, integrating two systems involves tedious custom development highly specific to the connection between those two systems. When the time comes to integrate another pair of systems, the integration process practically starts from the beginning, since the work from the first integration is frequently not easily applicable to other business relationships.

There are problems in current approaches with trying to enable large numbers of disparate systems to interact because they are subject to transport level failures. Any solution must overcome this shortcoming, providing some measure of guaranteed message delivery. The nature of Internet protocols is inherently point-to-point. A solution requires expanding this notion to support true point-to-multi-point communications. Once the physical disparities between two systems have been resolved, the CIF must then solve the problem of the architectural disparity between two systems. This architectural disparity can be broken down into two components. First, the way in which data is represented within each system is typically vastly different. Enabling communication between two such systems requires converting one data format into the other. Second, the events that each system processes may be fundamentally different.

The internal system level events, which trigger the internal business logic of each system, must be correlated. It can be deduced that this data conversion and event model correlation requires some level processing external to either system.

Another problem with current systems is that they do not support the wide scale implementation of system level interoperability. There are many ways to accomplish this goal and many tools on the market support the development of such solutions. But these tools generally do not support 'mass implementation' of system level interoperability. This requires scaling deployment to support dozens, hundreds or even thousands of inter-operating systems. Mass integration on this scale requires a new approach to systems integration. This type of integration requires a solution to be lightweight, remotely maintainable and require minimal support on the part of the transacting parties.

Wide scale integration implies some constraints. For instance, the deployment of a dozen installations is achievable by conventional means, i.e. visits by technical personnel to install configure and test each installation. When this number moves to the dozens, hundreds or even thousands of installations, this model does not scale. A viable solution must compensate for this limitation, so that it can support minimal technical ability on the part of the installation personnel, and fully remote maintenance of any and all installations. Maintenance refers to remote configuration, the addition of or changes to business logic, the addition or deletion of CIF software components and installation/updating of operational data.

Accomplishing wide scale integration of disparate systems provides little value, however if it exposes customers' proprietary data to prying eyes. As such, a satisfactory solution must accomplish these goals while ensuring the security of each participant's intellectual property. This entails coverage of the following security elements.

Authentication—Ensure that participants are who they say they are.

Authorization—Ensure that each participant has been granted access to other systems by a mutually trusted authority.

Non-repudiation—Ensure that neither party to a particular transaction can later deny involvement in the transaction.

Encryption—Ensure that access to sensitive data transmitted across the open Internet is restricted to the intended recipient.

Service level ACL—Ensure that access to the services implemented is restricted to the specified trading partners.

SUMMARY OF THE INVENTION

The present invention is directed to a method and system for facilitating the integration of a plurality of dissimilar systems. Some of the key features and benefits of the system include:

Enabling the exchange of data and/or events between disparate systems.

Bridging the physical gap between those systems.

Providing an execution environment for the business logic required to map the data and event models of the disparate systems.

Platform independence.

Supporting the inherent "one to many" integration model, e.g., enable the Trading Exchange model.

Providing for timely and secure exchange of data and/or events between disparate systems.

Minimizing internal development (with objective of lowering costs and reducing implementation time).

Supporting scalability, and specifically scalability with hardware.

Implementing public standards wherever possible, again with the objective of minimizing cost of the solution.

Supporting customization via configuration, which supports the requirement to minimize internal development.

DEFINITIONS, ACRONYMS, AND ABBREVIATIONS

Figure 1:
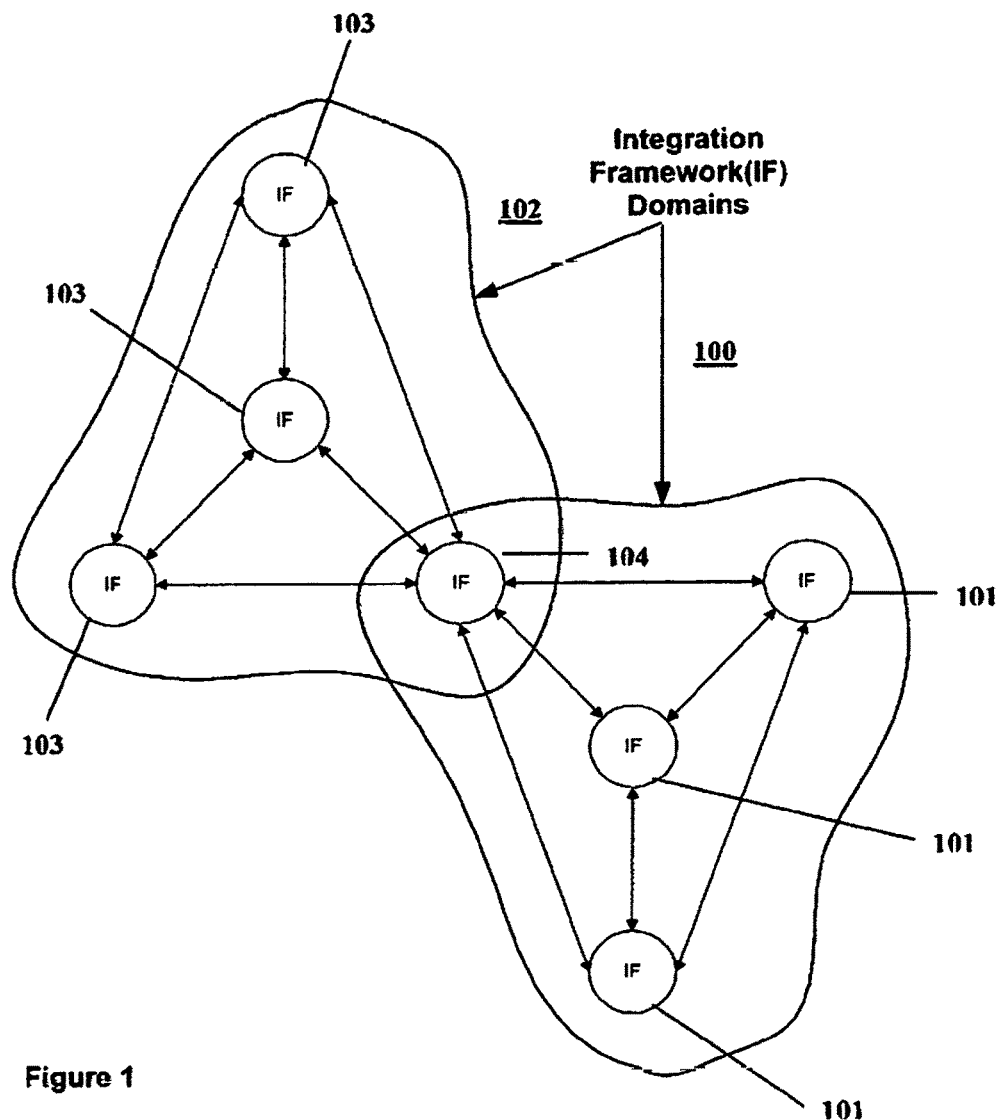
FIG. 1 represents a collection of integrated installations representing two distinct integrated domains.

Below is a list of definitions, acronyms and abbreviations used in this application. Most definitions are taken from internet.com's Webopedia, http://webopedia.internet.com.

Access Control List (ACL)—Access Control refers to mechanisms and policies that restrict access to computer resources. An Access Control List specifies what operations different users can perform on specific files and directories.

API—Application Programming Interface. Refers to a set of routines, protocols, and tools for building software applications.

ASP—Application Service Provider. Third party entities that manage and distribute software-based services and solutions to customers across a wide area network, from a central data center.

CORBA—Common Object Request Broker Architecture. An architecture that enables pieces of programs (objects) to communicate with one another regardless of what programming language they were written in or what operation system they are running on.

CRM—Customer Relationship Management. A comprehensive approach that provides seamless integration of every area of business that touches the customer, e.g., marketing, sales, customer service, field support, etc.

CXML—Commerce XML. Refers to a set of document type definitions (DTDs) for the XML specification. It was designed to standardize the exchange of catalog content and to define request/response processes for secure electronic transactions over the Internet. The processes include purchase orders, change orders, acknowledgments, status updates, ship notifications, and payment transactions.

DTD—Document Type Definition. A file that defines how the markup tags should be interpreted by the application presenting the marked-up document.

ECMAScript—ECMAScript is an international standard scripting language, based on Netscape's Javascript.

EDI—Electronic Data Interchange. EDI supports the transfer of data between different companies using networks, such as the Internet. It is a mechanism for enabling companies to buy, sell, and trade information.

ERP—Enterprise Resource Planning. An ERP system integrates all facets of the business, including planning, manufacturing, sales, and marketing.

HTML—Hypertext Markup Language. The authoring language used to create documents on the World Wide Web. It uses tags and attributes to define the structure and layout of a document.

HTTP—Hypertext Transport Protocol. HTTP is the protocol that defines how messages are formatted and transmitted and what actions web servers and browsers should take in response to various commands.

JAVA—A high-level programming language developed by Sun Microsystems. Java is an object-oriented language, similar to C++. Compiled Java code can run on most computers because Java interpreters and runtime environments (Java Virtual Machines or JVMs) exist for most operating systems.

JavaScript—A scripting language originally developed by Netscape to enable web authors to design interactive web sites. Although developed independently, it shares some of the features and structures of Java.

JDBC—Java Database Connectivity. A Java API that enables Java programs to execute SQL (Structured Query Language) statements, allowing Java programs to interact with any SQL-compliant databases.

JNI—Java Native Interface. A Java programming interface, or API, that allows developers to access the languages of a host system and determine the way Java integrates with native code.

JRE—Java Runtime Environment.

LDAP—Lightweight Directory Access Protocol. LDAP is a protocol for accessing information directories. Because LDAP is an open protocol, applications need not worry about the type of server hosting the directory.

MRP—Material Requirements Planning or Manufacturing Resource Planning. MRP is a concept for the computerized determination of requirements, procurement, storage, and the staging of material needed for manufacturing.

Non-repudiation—In general non-repudiation is used as an adjective to denote that the subject system can fit within a fully deployed infrastructure of certificate authorities and secure digital signature devices to show that a particular individual, or organization, was responsible for the content of a digital document.

SCE—Supply Chain Execution. SCE systems provide tools that communicate and optimize supply chain transactions. They deal with getting a job done, with decisions made in real-time, minutes, hours, or weeks in advance. Examples include Transportation Management Systems, Warehouse Management Systems, Order Management Systems, and International Trade Logistics Systems.

SCM—Supply Chain Management. The delivery of enhanced customer and economic value through synchronized management of the flow of physical goods, associated information, and financial information, from sourcing through to consumption. It is the equivalent of SCE+SCP.

SCP—Supply Chain Planning. SCP systems include supply chain network design, demand planning and forecasting, supply planning, manufacturing planning and forecasting, and distribution planning. SCP is focused on getting ready for a job, with decisions made from weeks to years in advance.

SOAP—Simple Object Access Protocol. Provides a mechanism for applications to communicate with each other over the Internet, independent of platform. SOAP relies on XML to define the format of the information and then adds the necessary HTTP headers to send it.

SSL—Secure Socket Layer. SSL is a protocol for transmitting private documents via the Internet. SSL works by using a private key to encrypt data that is transferred over the SSL connection.

TCP/IP—Transmission Control Protocol/Internet Protocol. The suite of communication protocols used to connect hosts on the Internet.

XCBL—XML Common Business Library. A suite of XML based document definitions authored by CommerceOne that are based on a subset of the EDI document set.

XML—Extensible Markup Language. A subset of SGML that enables designers to create their own customized tags, enabling the definition, transmission, validation, and interpretation of data between applications and between organizations.

XML Schema—XML Schemas replace DTDs as a way to describe and validate data in an XML environment.

XPATH—The primary purpose of XPath is to address parts of an XML document. In support of this primary purpose, it also provides basic facilities for manipulation of strings, numbers and Booleans. XPath operates on the abstract, logical structure of an XML document, rather than its surface syntax. XPath gets its name from its use of a path notation as in URLs for navigating through the hierarchical structure of an XML document. In addition to its use for addressing, XPath is also designed so that it has a natural subset that can be used for matching (testing whether or not a node matches a pattern); this use of XPath is described in XSLT.

XSLT—Extensible Stylesheet Language Transformations. The language used in XSL style sheets to transform XML documents into other XML documents. An XSL processor reads the XML document and follows the instructions in the XSL style sheet, then it outputs a new XML document. This is extremely useful in e-commerce, where the same data need to be converted into different representations of XML because not all companies use the same programs, applications, and/or computer systems.

DETAILED DESCRIPTION

Overview

The integration framework domains shown in FIG. 1 constitute a pure business-to-business (B2B) framework. The role of B2B is to interconnect corporate enterprises across the Internet. While Enterprise Application Integration (EAI) focuses on integrating applications within a specific corporate domain, B2B focuses on integration between corporate domains. An isolated integration framework installation operating within an enterprise provides little benefit in the way of B2B integration. While some benefit may be garnered by interconnecting back end systems within that enterprise, this type of solution is best left to EAI solutions. The true benefit of the integration framework is realized when networks of integration framework installations and/or other compatible B2B servers inter-operate across corporate enterprise boundaries to integrate the disparate systems operating within each corporate enterprise.

A collection of one or more integration framework installations that inter-operate within or across corporate domains is recognized as an integration framework Domain as shown by 100 and 102 in FIG. 1. The notion of an integration framework Domain was conceived to provide a mechanism for creating a closed system of inter-operating B2B servers. Examples of such a closed system would be a private trading exchange, or the interconnection of a buyer with a set of suppliers.

FIG. 1 represents a collection of integration framework installations representing two distinct integration framework Domains 100 and 102. Domain 100 has several integration frameworks shown as 101 and Domain 102 has several integration frameworks shown as 103. Notice that one of those integration framework installations 104 is configured to operate within both domains 100 and 102.

Integration framework Domains exist as a security measure, and to compartmentalize and isolate remote integration framework administration. Every integration framework installation is configured to operate within one or more integration framework Domains. As such, an integration framework cannot connect to another integration framework that is outside of its own domain(s). The integration framework Domain Administration tool described herein administers one or more integration framework Domains.

Domain Security

Figure 2:
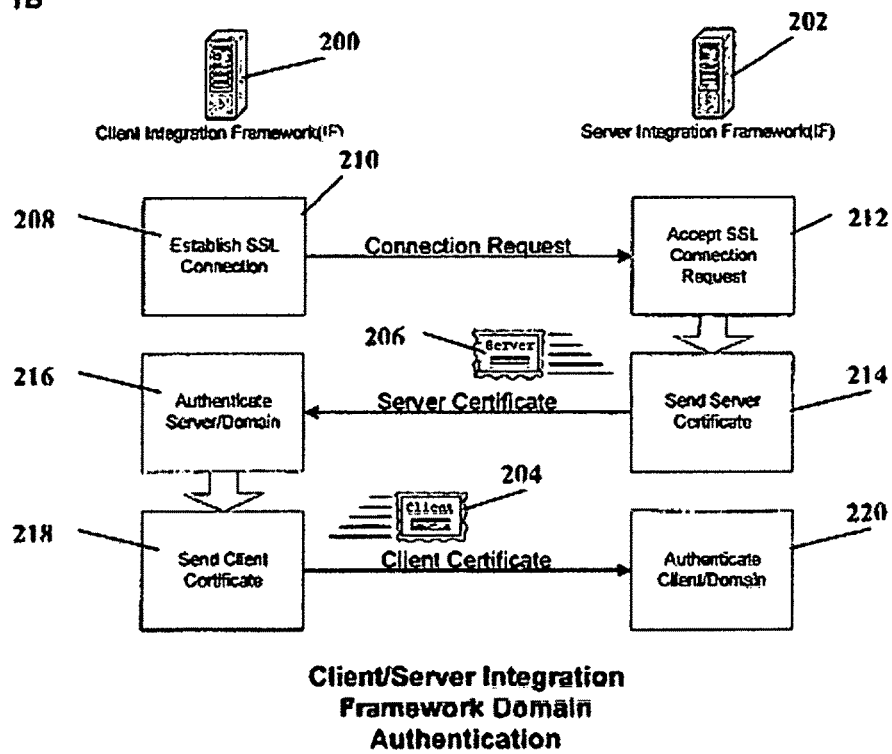
FIG. 2 shows the bi-lateral authentication of client and server integration framework using digital certificates.

Domain participation is administered by way of a client digital certificate deployed on each operational integration framework installation. This digital certificate, signed by a certifying authority running the integration framework domain, will enumerate the domains for which this particular integration framework installation is authorized to participate. When an integration framework initiates a transaction with a remote integration framework, this certificate is provided to the remote integration framework (server) during session authentication. During the client authentication process, the server integration framework verifies that the client certificate specifies the appropriate integration framework domain. FIG. 2 shows the bi-lateral authentication of client and server integration frameworks using digital certificates.

If an integration framework installation wishes to participate in more than one integration framework Domain, the certifying authority must issue a new client certificate specifying participation in multiple domains, and the previous certificate revoked. Client and Server certificates are installed on every integration framework installation via the Domain Administration Application. The process for installing digital certificates on a given integration framework installation is as follows. The domain administrator connects remotely to the integration framework using the Domain Admin tool. Integration framework configuration information is retrieved from the remote integration framework and a Certificate Signing Request (CSR) is constructed within the Domain Administration application using the integration framework configuration information. This CSR is submitted to the certifying authority for signing. The certifying authority signs the remote integration framework information, generating both a client and server digital certificate. The newly generated certificates are installed on the remote integration framework via the Domain Administration application. The certificate generation process must invalidate (revoke) any existing client/server certificates.

Figure 4:
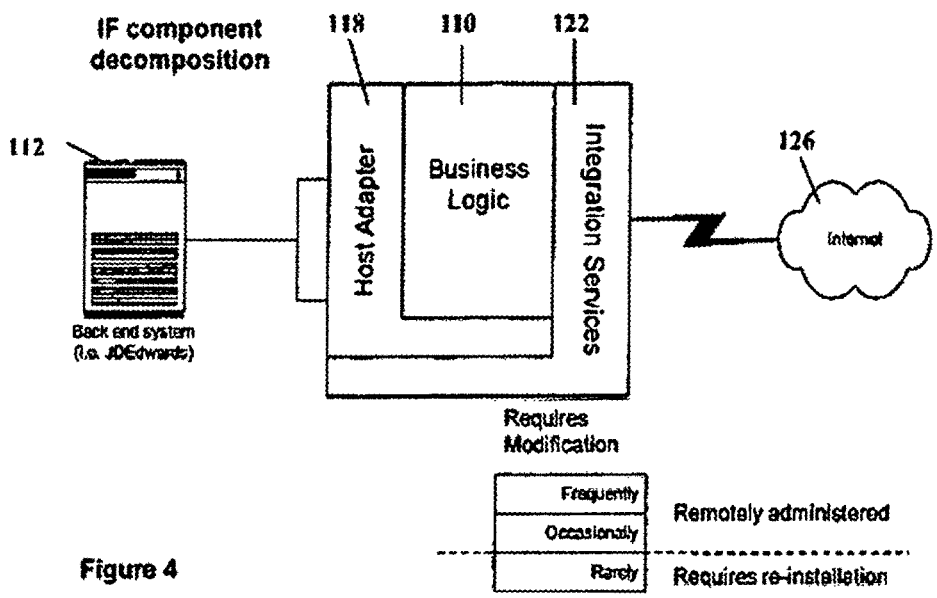
FIG. 4 depicts the logical separation of the integrated framework components, calling out the frequency with which each component tends to change.

Rather than compile, distribute and install all aspects of the integration component at a frequency dictated by changes in business logic, the integration framework subdivides the architecture into separate components that can be released independently of the others. These three components are known as Integration Services, Business Logic Processing Unit and one or more Host Adapters. FIG. 4 depicts the logical separation of the integration framework components, calling out the frequency with which each component tends to change.

The Integration Services component defines the foundation of the Integration Framework. An upgrade to the Integration Services component requires re-installation of the integration framework. Upgrades to the Host Adapter(s) and Business logic can be done remotely, without requiring a server restart. This component decomposition supports dynamic server upgrades, as well as remote administration of the Host Adapter and Business Logic.

Figure 1A:
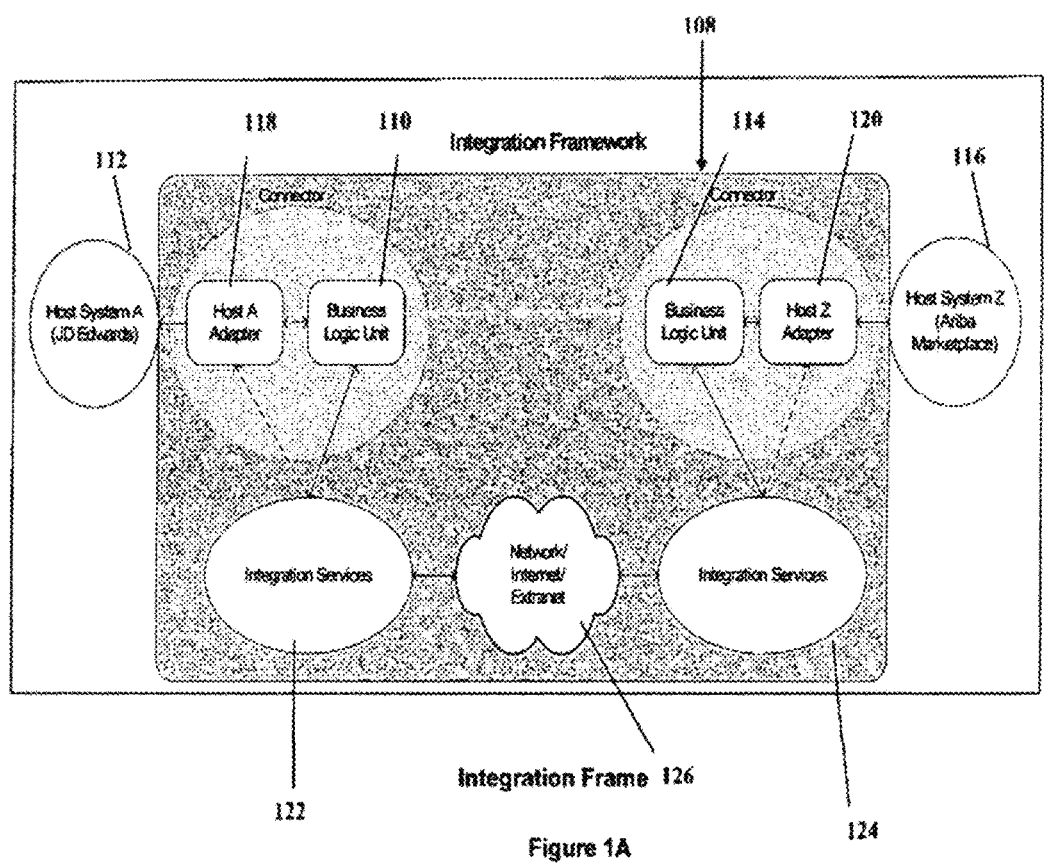
FIG. 1A represents an overview diagram of the integrated framework of the present invention.

Many of the reasons that the integration framework is so suitable for such a variety of enterprises rest in its architecture. The integration framework 108 has three main components that make up each host system as shown in FIG. 1A. These components include a Business Logic Processing Unit shown at 110 for Host System A 112 and Business Logic Processing Unit 114 for Host System Z shown at 116. Each host system also has a Host A Adapter 118 and a Host Z Adapter 120 connected to the respective Business Logic Processing Units 110 and 114 respectively. Host A Adapter 118 is connected to Host System A 112 and Host Z Adapter 120 is connected to Host System Z 116. The Host A Adapter 118 and Business Logic Processing Unit 110 are each connected to Integration Services unit 122. The Host Z Adapter 120 and Business Logic Processing Unit 114 are each connected to Integration Services unit 124. The two Integration Services units 122 and 124 are each connected to a Network or the Internet or an Extranet represented by element 126. These building blocks make up the integration framework 108 shown in FIG. 1A.

Business Logic Processing Unit—Each Business Logic Processing Unit 110 and 114, as the name implies, incorporates business logic for a company's unique transactional relationships. It receives requests, exchanges data with your back-end ("host") applications, and invokes other agents. It also distributes data to other systems, either internal or external to your organization. The Business Logic Processing Units 110 and 114 can establish contact with other integration frameworks in its integration framework domain. (An integration framework domain is a group of related integration frameworks managed by a common administrator shown as integration framework domains 100 and 102 in FIG. 1. An integration framework domain roughly corresponds to an industry, such as food or petroleum.) Business logic to be executed by the Business Logic Processing Units 110 and 114 is organized in one of two ways—Agents and Services, and Payload Processors.

In the Agent/Service model, each individual unit of business logic is referred to as a Service. One or more Services are grouped to form an Agent. This grouping is typically based on the general function of each of the grouped Services. For instance, a collection of Services that cooperate to provide interaction with a back-end financial management system might belong to the Finance Agent. Agents exist as remotely deployable software components. This model supports the reuse of similar business logic processes between integration framework installations.

The Payload Processor model involves tying units of business logic to predefined elements within the incoming XML payload document. A Payload Processor consists of one or more Payload Processing Rules. A Payload Processing Rule is the combination of a search pattern, and the definition of business logic to be executed whenever the search pattern is recognized within the incoming XML payload document. The search pattern conforms to the XPATH syntax as specified by the W3C. The associated business logic is defined via the integration framework administration application.

In general, the Agent/Service model supports document object model (DOM) based processing of the incoming XML payload while the Payload Processor model supports event based processing. The Business logic author is free to choose whichever model best suits a given application.

Host Adapter—The Host Adapters 118 and 120 serve to connect the Business Logic Processing Units 110 and 114 respectively to a company's existing systems. The Integration Framework Host Adapter 118 shown in FIG. 1B consists of three main layers connected to the JD Edwards Host System 112, which has a Host Application Programming Interface (API) 134. The bottom layer 136 actually exposes and accesses the data that the host API uses. Some applications provide a library of program functions that an external application (such as the integration framework) may call to access their data. For other applications, the Host Adapter 118 directly accesses the application's data files or relational database. The middle layer 138 defines relatively complex processes, such as various Business Objects, that involve a series of operations on the bottom layer 136. Submitting an invoice, for example, might require reading and writing data from multiple places. The top layer 140 provides a simpler Scriptable Interface or wrapper to the other two layers.

Integration Services—Integration Services 122 and 124 in FIG. 1A each provide a suite of network communication and data processing utilities to the other two components—the Host A Adapter 118 and Business Logic Processing Unit 110 and the Host Z Adapter 120 and Business Logic Processing Unit 114, respectively. Integration Services 122 and 124 each establishes secure connections between agents with a variety of protocols, such as SOAP and SMTP, in addition to supporting integration with standard Message Oriented Middleware (MOM) solutions, such as SonicMQ and MQSeries. The Integration Services components 122 and 124 also each provides for the management of the Business Logic Processing Units 110 and 114 respectively and Payload Processors running on separate machines to provide for fail over and scalability (load balancing).

Business Logic Processing Unit Component

A Business Logic Processing Unit 114 will execute all application-specific business logic, via the Host Z Adapter 120 component, and business logic provides logic to:

Process events and/or data received from the Host System Z 116 that are to be forwarded to one or more other (possibly remote) systems. For example, a process event might be an Ariba Marketplace (Host System Z 116) request for availability and price of a quantity of nails that is to be forwarded to one or more suppliers of nails. In this case, the appropriate Business Logic Processing Unit 114 requests received from other (possibly remote) Agents, which involve interaction with the Host System Z 116. For example, a request for availability and price of a quantity of nails received from a remote Agent representing the Ariba Marketplace by the Agent for a hardware supplier with a JD Edwards ERP Host System A shown at 112. In this case, the local Agent will process the request, interacting with the JDE-ERP Host System A 112 as necessary to determine availability and pricing. (Extending this model, the same supplier might choose to integrate with two different trading exchanges— say Buzzsaw and eSteel. In that case, we could simply create two agents: Supplier-to-Buzzsaw and Supplier-to-eSteel. Both Agents could interact with the JDE application via a single Host Adapter.)

Process responses being sent from one Host System to another. For example, the response to a request for price and availability of a quantity of nails. In this case, the Ariba Marketplace Agent will specify (for example) how the content of the response (payload) should be formatted for the Ariba Host System Z shown at 116.

Translate Host System specific data into a format recognizable by other (possibly remote) Agents. For example, the Ariba Marketplace Host System Z 116 upon receipt of a purchase order from a buyer, triggers business logic contained within a local Agent. The Business Logic Unit 114 extracts the pertinent purchase order data via the Ariba Host Z Adapter 120, and constructs a standard XML representation of this purchase order (e.g. XCBL Purchase Order document). The Business Logic Unit 114 then determines the destination of the purchase order from the purchase order data, and requests a service from (invokes a method on) a remote Agent located at the destination to handle the purchase order. This is accomplished via the Integration Services component 124. The remote Agent receives the standard XML purchase order document via its Integration Services component, parses the document, and interacts with its own Host System as necessary to input the purchase order information.

The Business Logic Units may operate within an ECMAScript (JavaScript) environment, enabling Agents to be fully customized (in the field) by Internet Consultants and Engineers. The Integration Services components 122 and 124 each exposes XML processing capabilities into the script environment, enabling XML queries (via XPATH) and XML translations via XSLT (Extensible Stylesheet Language Transformations, a language for transforming XML documents into other XML documents). The scripted nature of the Agent makes it the easiest component to customize— and in fact, for most implementations, the bulk of the customization work will be done on the Agent, not on the other two components, the Host Adapter or Business Logic Unite of the Integration Framework.

Host Adapter Component

The "Host System" is a software application. It could be an ERP system like JD Edwards, a trading exchange like Ariba Marketplace, a custom application, or an application with an HTML-based UI (e.g., a web storefront).

Figure 1B:
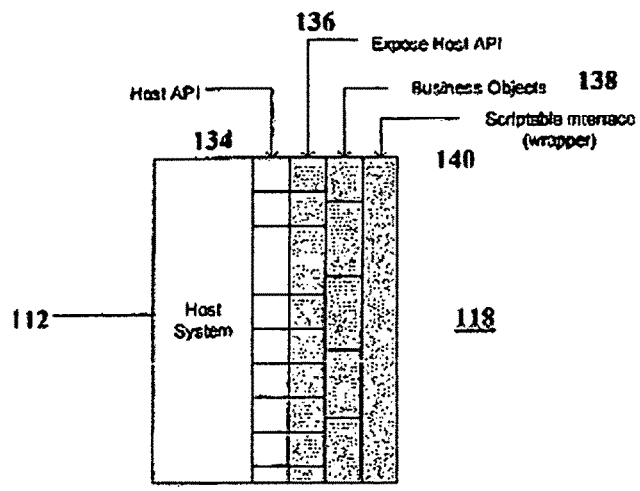
FIG. 1B represents the integration framework host adapter.

The Host Adapter such as 118 in FIG. 1B will enable one or more Business Logic Processing Units 110 to interact with the Host System API as shown in FIG. 4. The Host Adapter wraps the Host System 112 API 134 with code that makes it accessible from within the Agent scripting environment. This allows the business logic within an Agent to make calls into, and receive calls from the Host System API 134.

The Host Adapter 118 is comprised of three layers. The first layer 136 exposes the Host System API 134 (Application Programming Interface), essentially converting it to a Java API. (If the back-end system already has a Java API, this layer will be unnecessary). The second layer 138 defines higher-level business objects that involve multiple calls to the lower level Host System API 136, e.g., submit invoice, submit PO, query price and availability. This second layer 138 is designed to simplify scripting of business logic in the Business Logic Processing Unit 110. The third layer 140 wraps the first two (which are Java interfaces) with code that makes them both accessible to the ECMAScript environment of the Business Logic Processing Unit 110.

The Host Adapter component 118 is reusable with little or no customization, e.g., once a JD Edwards Host Adapter 118 is developed, it should be reusable on all projects that involve the integration of JD Edwards system 112 with some other application. The Host Adapter is designed to work with a specific release of the back-end application. If the customer upgrades to a newer version of back-end software, a new Host Adapter release may be required to access features of the new release. Block 127 shows that most modifications to the system can be done remotely, while re-installation is rarely required.

Integration Services Component

Figure 5:
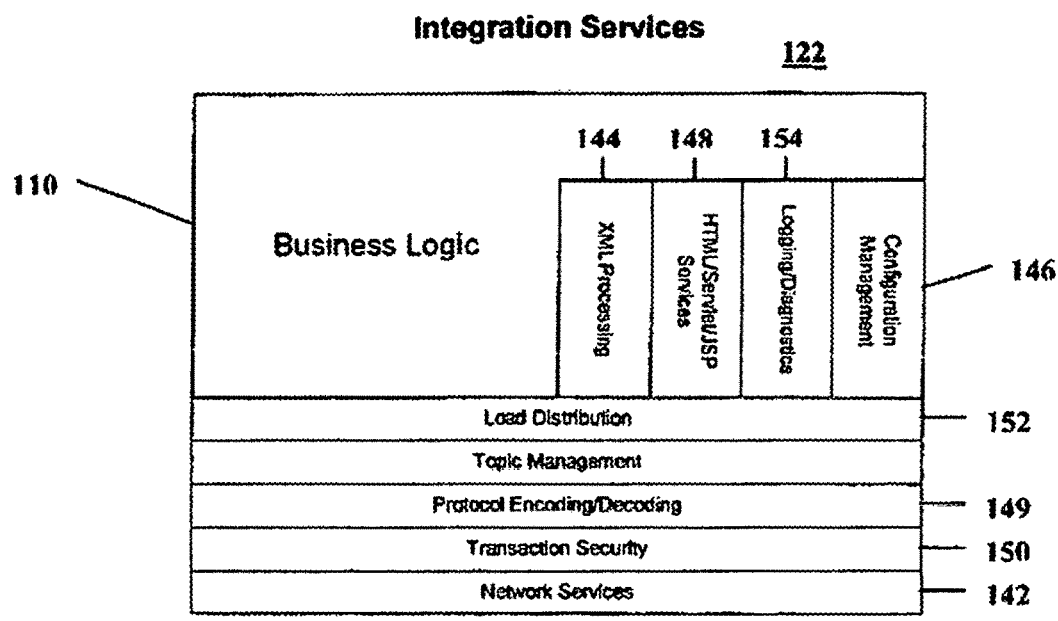
FIG. 5 depicts the services provided by the integration services component.

The Integration Services component 122 shown in FIG. 4 serves as the foundation of the integration framework. This component is actually a collection of system level services available to both the Host Adapter(s) 118 and the Business Logic Processing Unit 110. While each service is defined below, it is important to note that the Integration Services component 122 represents the lowest layer of integration framework functionality. As such, the installation of an integration framework is basically the installation and configuration of the Integration Services component, Host Adapters for communicating with the host file system and an Agent that supports remote integration framework administration. This basic configuration supports the remote administration for installation of additional Host Adapters and Business Logic Processing Units. FIG. 5 depicts the services provided by the Integration Services component 122. A description of each of the services within the Integration Services component 122 follows. The definition of these services roughly flows bottom to top with respect to FIG. 5.

The Integration Services component 122 provides various system level services, including Network Access services 142, Agent Management and XML Processing services 144 for the Agents, as well as services to support agent administration, installation, and configuration 146. The Communication services 148 contains the mechanisms for handling the sending and receiving of requests between Agents, e.g., SOAP/SMTP encoding 149 and/or interaction with MOM. Partner registration services are also supported.

All communication services provided by the Integration Services Component support SSL based encryption 150 of outgoing messages and certificate based remote partner and message authentication.

The Agent Management services provided by the Integration Services Component include the dynamic installation/removal of agents (including the associated Host Adapter component(s)), enabling/disabling installed Integration Services, Service invocation, execution monitoring, load sharing 152 and usage monitoring 154 (for the potential per transaction fee based model).

The XMT, Processing services 144 enables Agent processing of XML documents from within the scripting environment—for example, enabling the query of an XML document for all elements with Product=Nails-, translation of data from one XML format to another—for example, the conversion of an XCBL invoice to an CXML invoice- and direct manipulation of XML data from ECMAScript—for example, construction of a new XML document, or modifying content within an existing XML document. XSLT technology is used for transformation of documents from one format to another. XML Schema and DTDs are used for validation of the document formats. XPath is used to select sub-trees of documents or whole documents that match conditions defined on document content and structure, from which new documents can be constructed based on what is selected. XPath is also used in conjunction with XSLT to address sub-parts of an XML document that can be used to determine whether nodes conform to a pattern.

The Integration Services are "constant or generic" components of the Integration Framework, requiring little or no application-specific customization.

The encapsulation of functionality into these three components maximizes reusability. While each business has unique requirements, neither the integration framework provider nor its clients are ever in the position of having to "reinvent the wheel." For each back-end system (such as Intershop, Manugistics, OracleApps, QuickBooks, SAP, or even custom mainframe legacy applications), the Host Adapter 118 provides a uniform interface that the integration framework can rely on for all users of that software package. The integration framework provider develops the Host Adapter for each back-end application once, and that Host Adapter is highly reusable. Since the Business Logic Processing Unit 110 is, to some extent, unique to a particular integration, it does require some customization. The Business Logic Processing Unit, however, is designed with ease of customization in mind. The integration framework provider and Internet Engineers adapt the Business Logic Processing Unit to a client's particular business rules.

Unlike some other integration solutions, the present invention makes extensive use of several established standards and Internet protocols. The fact that the integration framework uses several well-known protocols means that users can easily establish contact with the integration framework. Using the Hyper Text Transfer Protocol (HTTP) interface, a user can interact with the integration framework in a Web browser. If HTTP connectivity is not available, due most likely to a firewall, the integration framework also supports Simple Mail Transfer Protocol (SMTP). Through the SMTP interface, a user can exchange information with the integration framework using any Internet mail client. While the integration framework will probably be getting a great deal of its information from other integration framework installations, it is a reality that many mid-sized companies do not have back-end systems that cover the whole of their business process. So, HTTP and SMTP interfaces provide a very useful way to carry out manual processing without installing a complex dedicated client application.

The integration framework Web server responds to client connections, and an LDAP server provides for maintaining user information. The integration framework also adheres to a number of Internet security standards. The Secure Sockets Layer (SSL) technology is the same that Web browsers and many other Internet applications use to protect their data from interception (encryption) and to verify the other party's identity in communications (authentication). The integration framework's primary means of representing data is also an open technology; it uses Extensible Markup Language (XML) for this purpose. XML, an extensible derivative of SGML, provides for the representation of complex objects in a uniform and hierarchical manner. The integration framework employs the Simple Object Access Protocol (SOAP v1.1). SOAP represents a standard means of accessing distributed objects using XML payload syntax. The Universal Description Discovery Integration (UDDI) initiative uses SOAP to substantially simplify communications between objects. The integration framework also interfaces with a number of Message-Oriented Middleware (MOM) applications through the Java Message Service (JMS) API. The scripting language that the integration framework uses for defining business rules (in the Business Logic Processing Unit) is ECMAScript-262 (JavaScript), a language that, while powerful, is fairly accessible to individuals without a high degree of programming experience. Finally, much of the rest of the integration framework is in Java, a leading open platform language developed by Sun Microsystems.

The integration framework's Java implementation means that the integration framework can run on multiple hardware platforms. The integration framework supports both Windows and Unix environments, and easily adapts to any environment for which a Java Runtime Environment (JRE) is available. Since the hardware environment for business systems today is quite heterogeneous, it makes a great deal of sense to develop on a platform that will run on as many types of systems as possible. Java programs will run on any Java Runtime Environment (JRE) without recompilation, regardless of the underlying hardware. Indeed, in addition to running on both the Windows and Unix platforms, the integration framework's hardware requirements are rather basic. A minimal installation of the integration framework will run on a "standard" desktop machine.

The integration framework leverages the extensive infrastructure that the Internet brings with it, while overcoming its shortcomings as a business communications tool. Since the Internet is decentralized and highly dependent on intermediate systems, it, by itself, has a certain amount of inherent unreliability. When one party sends a message to another by standard Internet mail, for instance, the sender cannot prove or even know that the recipient actually received it. The integration framework, however, provides a facility for easily interfacing with $3^{rd}$ party Message Oriented Middleware that provide guaranteed message delivery and also generates audit trails. When two parties engage in a transaction through the integration framework, each party will know that the other received all related messages. Through the SSL authentication process, each party will be able to verify the identity of the other party. The integration framework utilizes the security features provided by the MOM vendor.

Also, unlike most Internet mail, the information in messages that the integration framework exchanges is secure. Since the messages travel in encrypted form, any entity intercepting them would likely find them unintelligible. While many other products use SSL and it is a proven technology, it is only part of the integration framework's comprehensive security architecture. Data security is a pre-eminent consideration in the integration framework. Client and server digital certificates secure communication between integration frameworks. Smart card technology secures administration functions and access to the client's Business Logic. With a smart card, an administrator can access, configure, and monitor an integration framework node from anywhere on the Internet.

Like the Internet, however, integration framework domains allow for a dynamic understanding of the machines and organizations that comprise them. Whether one is in a traditional supply chain environment or a trading exchange, businesses regularly forge new relationships and end existing relationships. The integration framework provider administers integration framework domains for various industries, and one party can integrate with any other party in its domain.

Network Access

At the lowest level, all integration framework network communication takes place using the HTTP(S) network protocol. HTTP(S) is a mature, stable and well documented network protocol, and has become the standard for inter network communication. The Integration Services component contains a configurable number of HTTP(S) listeners, waiting for incoming service requests. It is intended that the HTTP(S) keep-alive session facility be utilized to enable multiple individual HTTP(S) request/response pairs over a single TCP/IP connection).

Transaction Security

FIG. 2 shows bilateral authentication of client and server integration framework domain authentication using digital certificates. Each transaction between a client integration framework 200 and server integration framework 202 as shown in FIG. 2 will optionally utilize the HTTP(S) features to provide for remote authentication, non-repudiation, encryption and service authorization. HTTP(S) uses digital certificates to provide these security services. Since the authentication process is bi-directional, both a client certificate 204 and a server certificate 206 are required for each integration framework installation. The certifying authority must generate all integration framework certificates. Each certificate is generated for the express purpose of integration framework-to-integration-framework communication within one or more integration framework Domains.

Bi-directional authentication means that when a client integration framework 200 initiates communication through an SSL connection 208 making a connection request 210 through an accept SSL connection request 212 with a server integration framework 202, the server integration framework 202 returns a server certificate 206, sent and signed by the certifying authority 214. The client 200 uses a factory installed public key certificate authenticate server/domain 216 to validate that the server certificate 206 was indeed signed by the certifying authority 214, then the client authenticate server/domain 216 verifies the server URL/IP Address and integration framework 202 Domain name. Once the client 200 has authenticated the server 202, the client certificate sending authority 218 then submits a client certificate 204 to the server integration framework 202. The server integration framework 202 then reverses the process in the authenticate client/domain 220 for the client 200. The HTTP(S) protocol then provides for the private key exchange and facilitates encryption for the remainder of the session.

Non-repudiation is achieved as the client 200 digitally signs (using it's private key) the message request contents. The server 202 similarly signs the response contents, thereby assuring that each party is bound to the transaction. This eliminates the threat of either party denying participation in the transaction.

Service level access control is achieved by using the signed remote server URL/IP Address information to authorize the remote integration framework for the specified service invocation. If the remote integration framework has not been authorized to request this service, the service request is denied, and an error message returned to the client.

Figure 3:
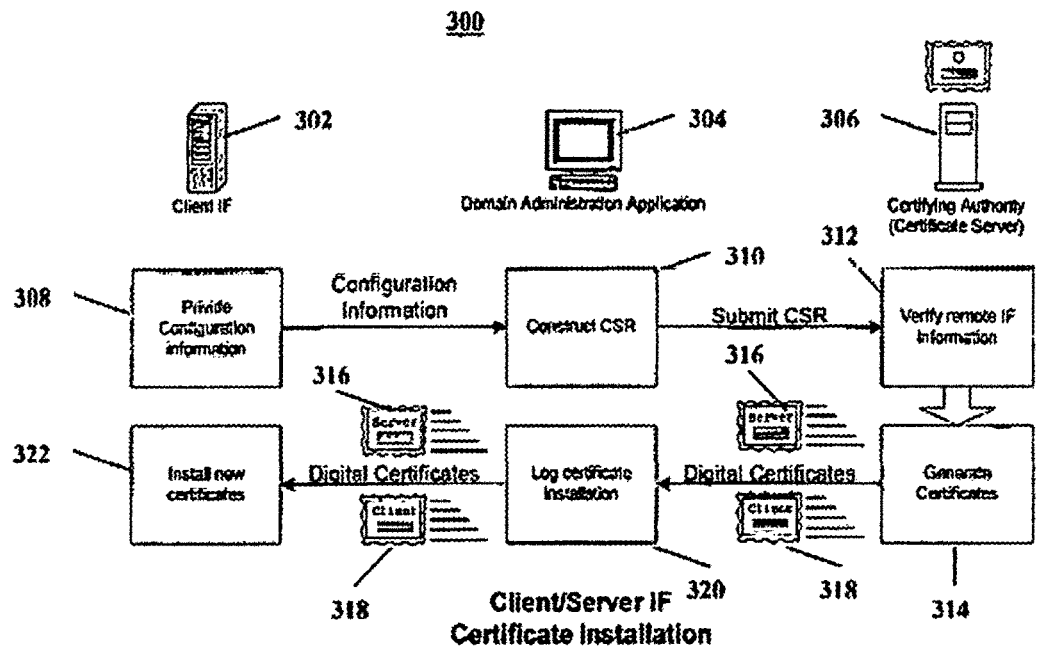
FIG. 3 demonstrates the interaction between an integrated framework installation, the domain administration application and the certificate server during client/server certificate generation.

FIG. 3 demonstrates the interaction between a client/server integrated framework installation 300, the client integration framework 302, the domain administration application 304 and the certificate server 306 during client/server certificate generation. It is intended that standard X.509 version 3 digital certificates will be used. The version 3-certificate extensions field is used to identify the list of integration framework Domains for which the certificate is valid. Version 3 certificate extensions are also used to specify sub-domain access control. This entails the specification of one or more individual integration framework addresses (IP or URL) to be either included or excluded (but not both).

The certificate installation 300 shows that the client integration framework 302 provides configuration information 308 to the domain administration application 304 to construct a Certificate Signing Request (CSR) 310 which is submitted to the certificate server 306 to provide verification of remote integration framework information 312. The information 312 is passed to a certificate generator 314 which generates both digital server certificates 316 and client certificates 318. These certificates 316 and 318 are passed to a certificate log installation 320. The certificate log installation 320 then passes the logged digital server certificates 316 and client certificates 318 for installation 322.

Protocol Encoding/Decoding

The HTTP(S) protocol defines a session based network connection, with no provision for the structure of the data that will traverse this connection. In order for two endpoints to effectively communicate, some structure to the data passed through the HTTP(S) connection must be agreed upon. Fundamentally, this structure is comprised of XML formatted data. While XML formatted data provides structure and meaning to the data, there still needs to be some level of agreement between the involved parties as to the specific XML format to be used. This section deals with that encoding.

Fundamentally, when one integration framework wishes to communicate with a remote integration framework, the structure of that message must include a message identifier, and a message body. The message identifier serves to identify what operation is to be performed by the remote integration framework as a result of receiving this message, while the payload represents the data to be operated on. The terms used throughout the rest of this description refer to the message identifier and message body respectively as 'topic' and 'payload'.

The topic and payload are implemented using variable length character strings. Ideally, the topic will be a structured character string that identifies to the receiving integration framework the processing which is to be performed, while the payload will be a serialized, well formed, and ideally validated XML document. This definition is broad enough to apply to each specific supported encoding protocol defined below.

SOAP Processing

Figure 6:
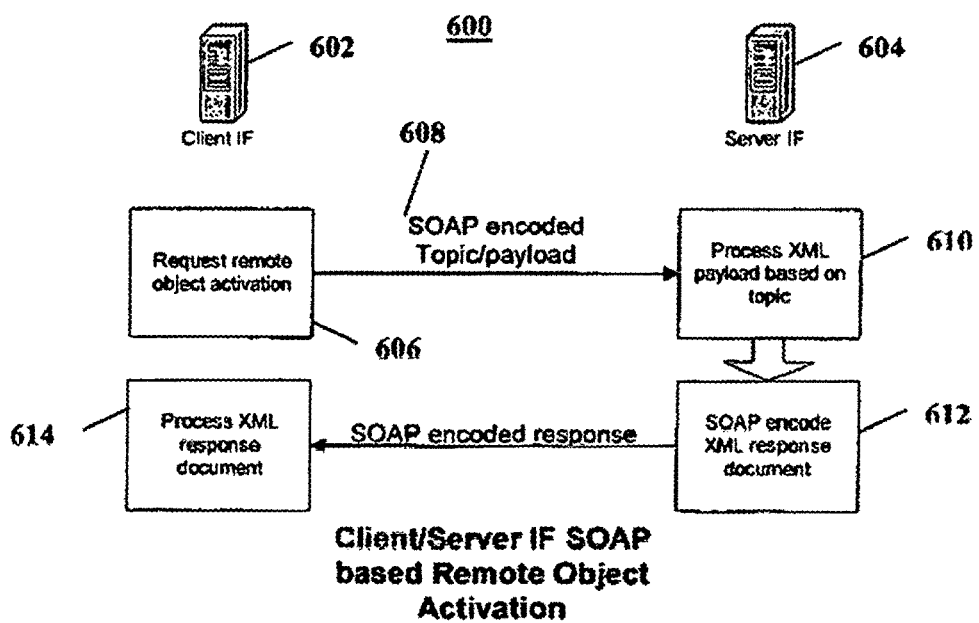
FIG. 6 depicts typical remote object activation request processing.

FIG. 6 depicts typical remote object activation request processing in a client/server integration framework 600 having a client integration framework 602 and a server integration framework 604. The Simple Object Activation Protocol (SOAP) is a public standard for transmitting XML documents over HTTP(S). The SOAP protocol is defined and specified by the WorldWide Web Consortium (W3C) (http://www.w3.org/TR/SOAP/). It is intended that the integration framework fully support, and be compliant with at least the SOAP protocol, version 1.1. The SOAP protocol allows physically disparate integration framework installations to communicate with one another, activating remote objects (Services), and passing parameters (XML payload).

The SOAP protocol is a point-to-point protocol. What this means is that a calling (client) integration framework 602 makes a request remote object activation 606 which has a SOAP encoded topic/payload 608 that must specify a distinct network address (URL or IP Address) for each remote integration framework installation it wishes to communicate with. The SOAP encoded topic/payload is sent to the server integration framework 604 for processing of the XML payload based on topic, which is shown at 610. A SOAP encode XML response document 612 is generated and that encoded response is then processed by client 602 as an XML response document 614. This results in the embedding of remote integration framework information in local business logic. The SOAP protocol is also a synchronous protocol. This means that the calling thread of execution must halt until all remote processing has completed by a given remote integration framework before execution of business logic processing can continue. Because the SOAP protocol is based on HTTP(S), it is only as reliable as the underlying HTTP(S) protocol. Since the HTTP(S) protocol is subject to failure, based on network availability, timeouts, routing problems etc., retry and recovery logic must be embedded within the local Business Logic.

SOAP Security

Security, in the form of client/server authentication, encryption, non-repudiation and service level access control is based on the underlying HTTPS protocol, and the digital certificate model described with regard to FIGS. 2 and 3.

MOM Processing

Figure 7:
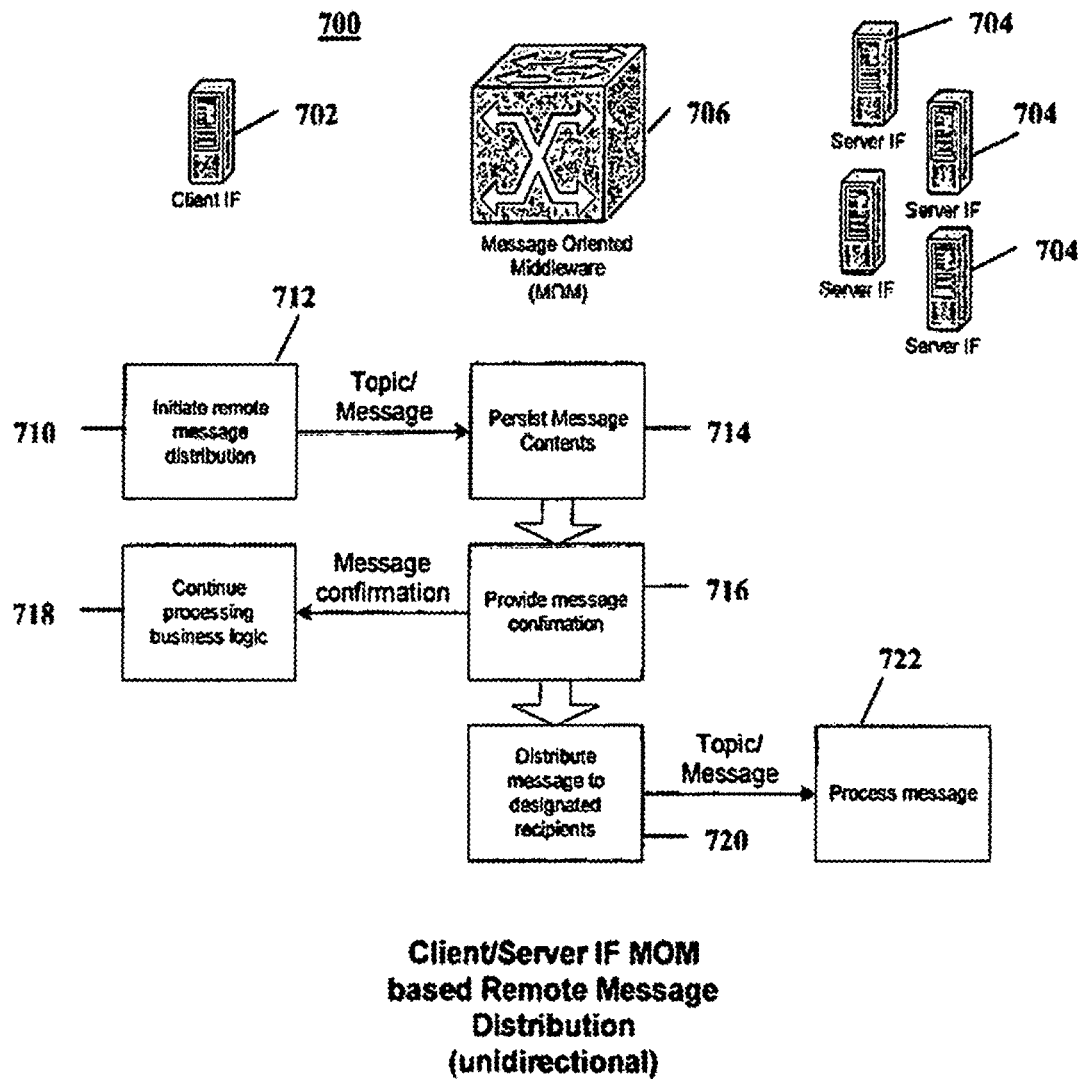
FIG. 7 depicts typical asynchronous, unidirectional message distribution processing.

FIG. 7 depicts typical asynchronous, a client/server integration framework unidirectional message distribution processing system 700 having client integration framework 702 and multiple server integration frameworks 704. In order to overcome some of the shortcomings of the SOAP protocol, Message Oriented Middleware (MOM) 702 is optionally used as an enhanced network transport mechanism. MOM 702 provides a de-coupling of the message distribution logic from the integration Business Logic. MOM provides for message Quality Of Service (QOS) that surpasses that available from the SOAP protocol.

MOM 706 typically supports the notion of point-to-multi-point data transmission. Point-to-multi-point transmission is typically implemented using the publish/subscribe model. In this model, each installation acts as an end-point to the MOM 706. During message distribution, one integration framework acts as the publisher of a message, while one or more remote integration frameworks act as subscribers. This frees the originator of a message from knowing who will be the recipients of a particular message. MOM maintains routing and distribution logic that it uses to make routing decisions at runtime. This allows for dynamic changes to the message distribution paths, without modification to the Business Logic operating within the integration framework endpoints.

An initial remote message distribution 710 from client integration framework 702 sends a topic/message 712. MOM 706 typically supports guaranteed delivery of messages by providing a persistence layer 714 for persistent message contents within the MOM architecture. This means that when a message is submitted to the MOM 706 by the client integration framework 702, the message contents are persisted at 714. Message confirmation 716 is then provided to the client 702, so that it may continue processing business logic 718 prior to acknowledgment by the MOM that the message has been received. Message confirmation 716 also distributes the topic/message to designated recipients shown at 720 which is then processed at 722 by designated client server integration frameworks 704. Once a message producing integration framework receives acknowledgment that the MOM 706 has received the message, it can rest assured that this message will not be lost.

MOM supports asynchronous processing by the message producer. This allows the Business Logic thread of control to submit a message to the MOM, and immediately continue executing local Business Logic. In a separate thread of control, the MOM takes responsibility for continuing with message distribution.

MOM 706 typically provides for unidirectional messaging. The architecture of most MOM implementations is directed toward the flow of messages from a message producer at 702 to one or more message consumers at 704. If a message consumer wishes to respond in some way to the receipt of a message, this is typically a separate and distinct message flow. This is a primary distinction between the abstract notion of message distribution and object activation. Object activation typically involves an object activation message, including a topic and a payload, and an associated response from the activation message consumer back to the activation message producer. MOM provides a superior platform for message distribution, while SOAP provides for simple object activation.

MOM typically requires a physical implementation platform separate and distinct from the integration framework implementation platform. This implementation can be either remotely hosted, or co-located with one or more integration framework installations. This physical implementation is typically dictated by the specific MOM implementation.

Figure 8:
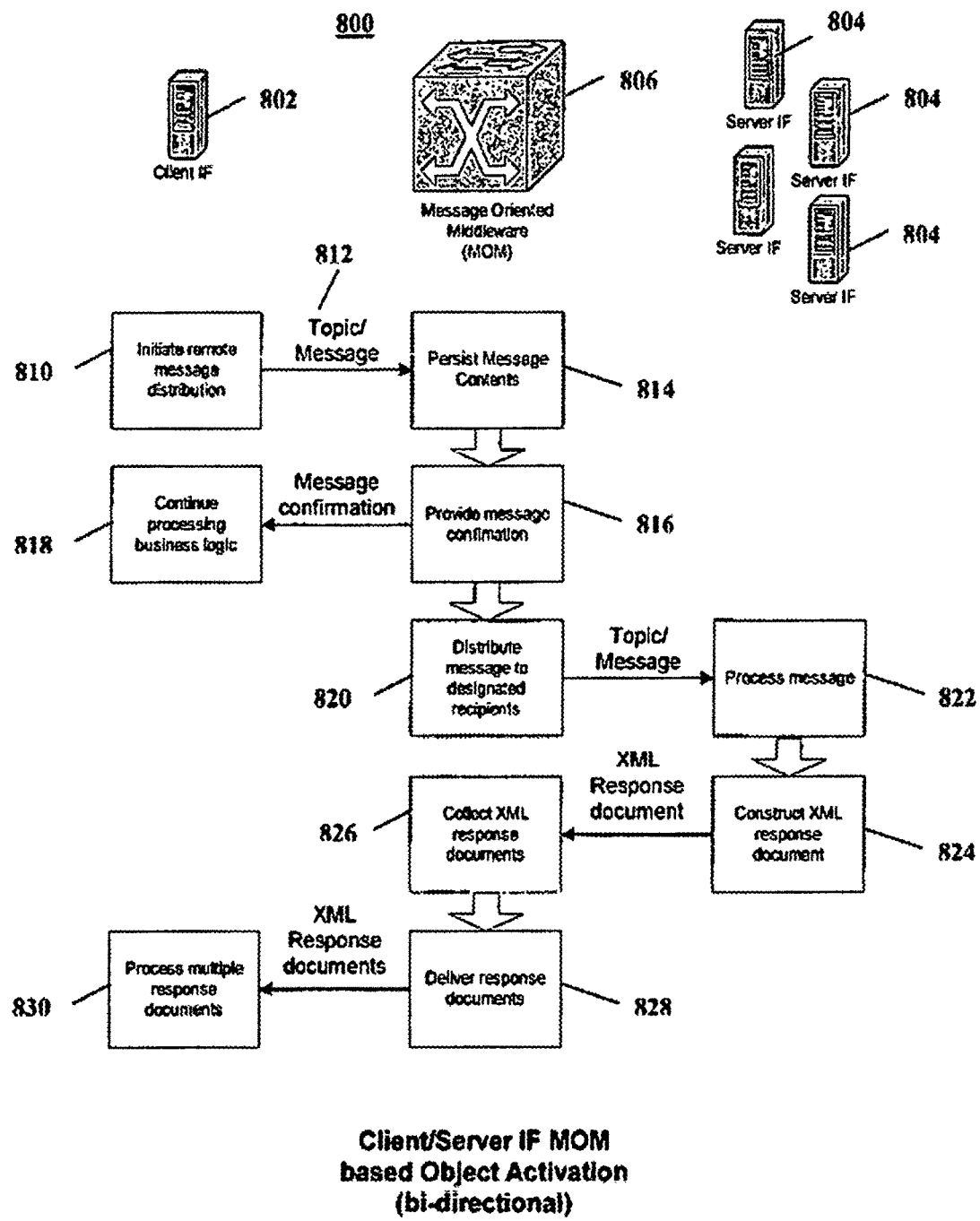
FIG. 8 shows typical bi-directional object activation using MOM point-to-multi-point processing.

As described FIG. 7 depicts typical asynchronous, unidirectional message distribution processing, while FIG. 8 shows typical client/server integrated framework MOM bi-directional based object activation point-to-multipoint processing system 800. System 800 has a client integration framework 802, multiple server integration frameworks 804 and MOM 806. As FIG. 8 depicts, the asynchronous nature of MOM based object activation requires some form of multi-response processing on the part of the message producing integration framework. The multi-response processing must correlate all object activation responses with the appropriate outgoing object activation request. This is accomplished by having the message producing integration framework establish a response message queue, and pull messages from the response queue, delivering them to the appropriate business logic processing unit. Object activation request response correlation is achieved by associating an objects activation request identifier that is distributed with each object activation request. The message consuming integration framework associates this activation request identifier with the activation response document.

As seen in FIG. 8 in addition to the steps 810, 812, 814, 816, 818, 820 and 822, which correspond to the counterpart steps as described with respect to FIG. 7, the processed message 822 is then constructed as an XML response document 824, which is sent to a collection point for all XML response documents 826. The collected response delivered as shown at 828 and finally processed as multiple XML response documents at 830.

MOM Security

Each MOM implementation has its own security implementation. Many MOM implementations are based on the HTTP protocol, and as such leverage the HTTPS security capabilities. Others may use proprietary security infrastructure. The security requirements of the specific implementation must be considered during the MOM implementation selection phase.

SMTP Processing

At the low end of the MOM implementation spectrum lays the SMTP (standard email) protocol. SMTP provides for point-to-point, point-to-multi-point and asynchronous message distribution.

The SMTP protocol provides a simple, reliable and virtually ubiquitous platform for object activation and/or message distribution. For integration framework implementations that warrant point-to-multi-point and/or asynchronous communication, object activation and message distribution using SMTP provides a low-end solution for clients who can't or choose not to implement a more formal MOM solution.

An integration framework installation acting as a message producer can use the SMTP protocol and a mail server to asynchronously distribute object activation requests and messages. For point-to-point communication, the message producer specifies a single email address associated with a message consumer. For point-to-multi-point message distribution, an email distribution list can be configured within the email server, specifying the intended recipients. Integration framework installations acting as message consumers can use either the POP3 or IMAP protocols to receive object activation requests and messages. Once a message consumer has processed an object activation request, the response can be delivered back to the message producer using the Reply-To: address of the incoming message.

The message topic should be submitted as the email Subject: while the payload may be transferred as the either as the message body or as an email attachment. For object activation requests requiring response processing, the SMTP Reply To: field should contain the email address for all responses. Multi-response correlation requires that an object activation request identifier be delivered with the activation request, and supplied within the response document. It is up to the designer to specify the details of object activation request identifier packaging within the request and the associated response documents.

Figure 9:
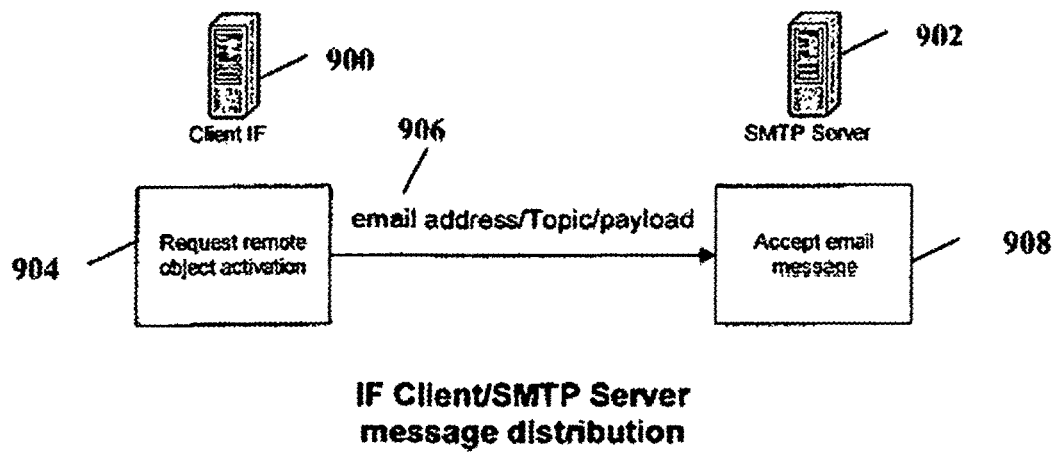
FIG. 9 depicts communication between the message producing integration framework and the SMTP server.

FIG. 9 depicts communication between the message producing client integration framework 900 and the SMTP server 902. The client integration framework 900 requests a remote object activation 904, which sends an email address, topic and payload 906 to the SMTP server 902 to accept the email message 908.

Figure 10:
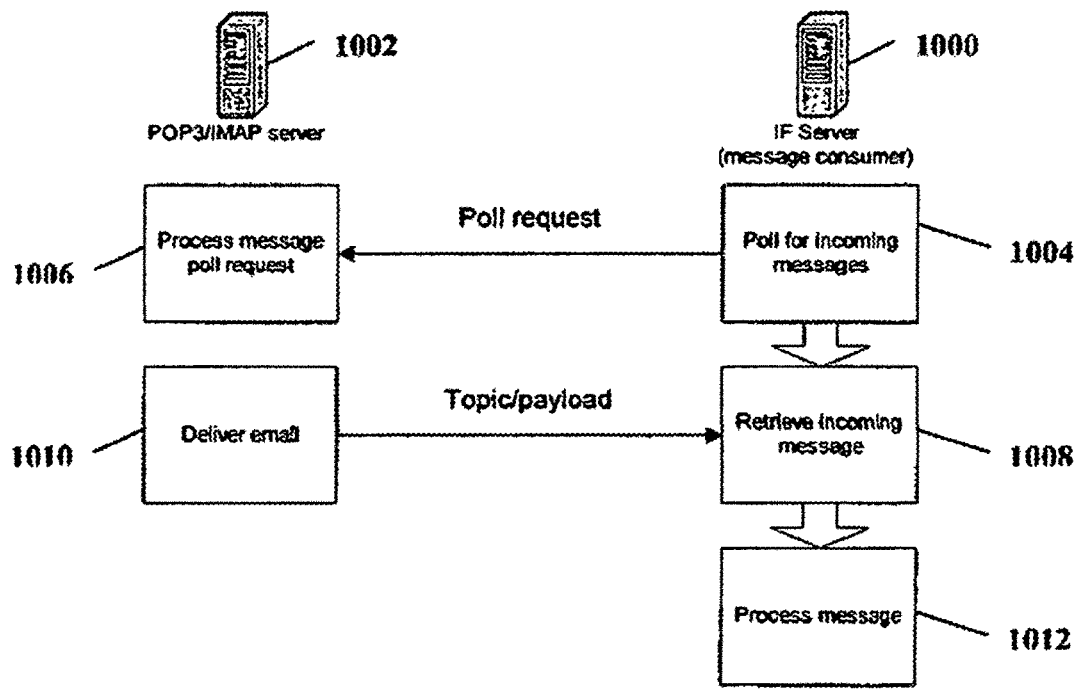
FIG. 10 depicts communication between the message consuming integration framework and the POP3/IMAP server for unidirectional message distribution.

FIG. 10 depicts communication between a message consuming integration framework server 1000 and a POP3/IMAP server 1002 for unidirectional message distribution. The server 1000 polls for incoming messages 1004, which requests are processed by POP3/IMAP server 1002 as process message poll requests 1006. At the same time the server 1000 retrieves incoming messages 1008 from the email 1010 being delivered by the POP3/IMAP server 1002. The incoming messages 1008 are processed at 1012.

Figure 11:
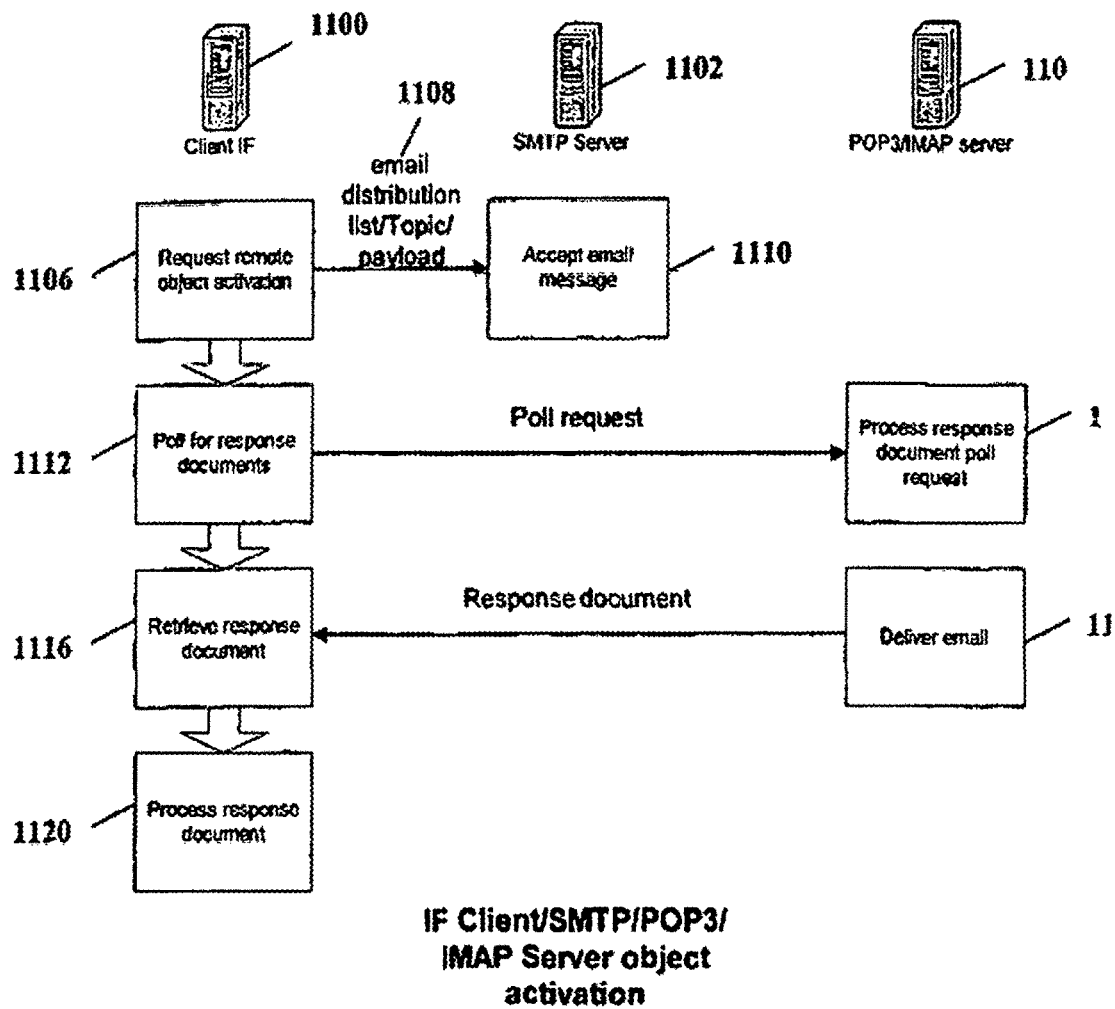
FIG. 11 depicts communication between the message producing integration framework and the SMTP and POP3/IMAP servers.

FIG. 11 depicts communication between a message producing client integration framework 1100 and an SMTP server 1102 and POP3/IMAP server 1104. The client integration framework 1100 provides a request remote activation object 1106, which sends email distribution list/topic/payload 1108 to SMTP server 1102 as accepted email message 1110. Request remote object activation 1106 also sends to poll for response documents at 1112, which sends a polls request to POP3/IMAP server 1104 to process response document poll request at 1114. Meanwhile client integration framework polling for response documents at 1112 retrieves response documents at 1116 from email that may be delivered at 1118 from server 1104. The retrieved documents at 1116 are then processed by client 1100 as response documents at 1120.

Figure 12:
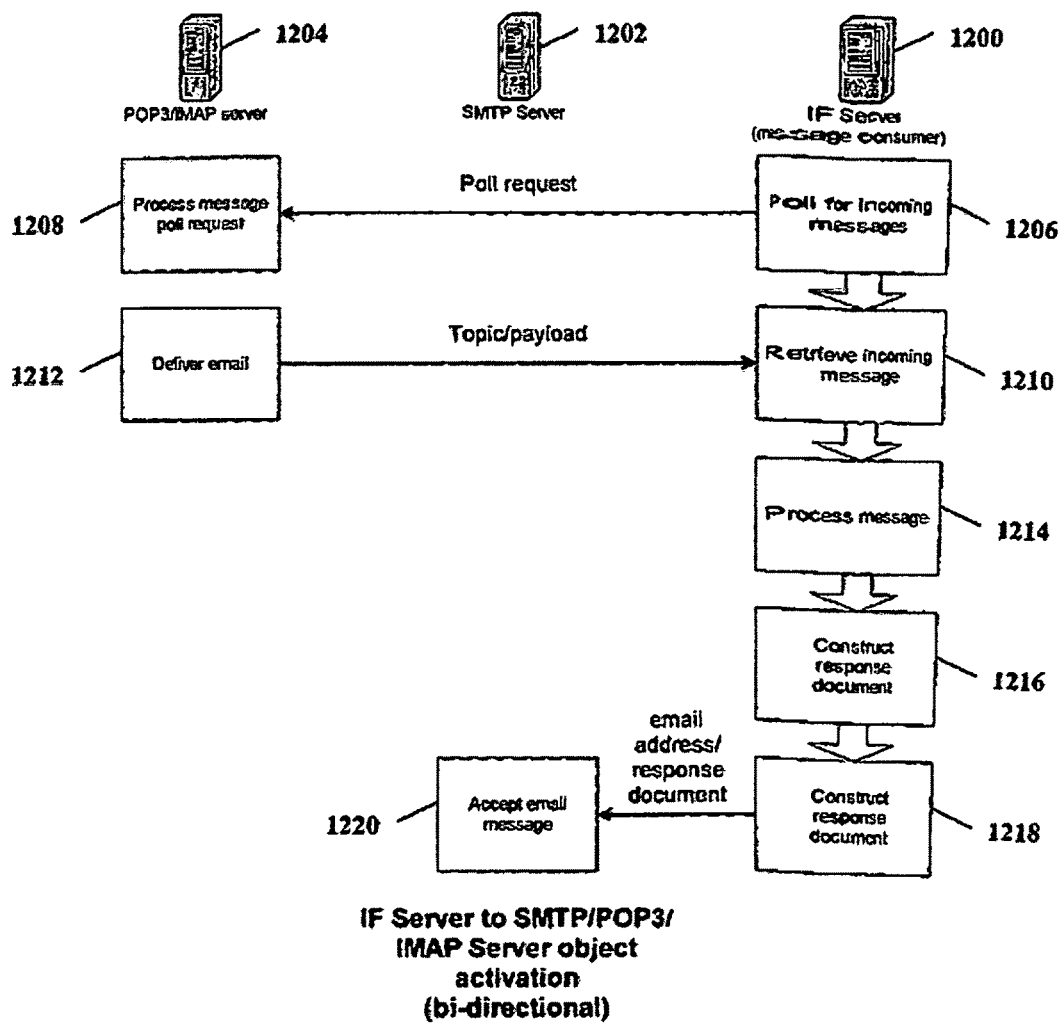
FIG. 12 depicts communication between the message consuming integration frameworks and the SMTP and POP3/IMAP server for bi-directional object activation.

FIG. 12 depicts communication between a message consuming integration framework 1200 and an SMTP server 1202 and POP3/IMAP server 1204 for bi-directional object activation. The message consumer server 1200 polls POP3/IMAP server 1204 for incoming messages at 1206, which polls for process messages at 1208. Incoming messages are retrieved at 1210 from 1206 and delivered email 1212 from server 1204 with topic/payload is retrieved at 1210. The retrieved messages at 1210 are processed by server 1200 at 1214, while those processed messages at 1214 have response documents constructed at 1216. The constructed response documents at 1216 are further constructed at 1218 with email addresses and response documents. From 1218 the constructed response documents are sent and accepted as email messages at 1220 of SMTP server 1202.

SMTP Security

SMTP security is implemented based on standard S-MIME processing supported by most email servers. This entails the installation of an S-MIME digital certificate on each message producing integration framework installation that utilized the SMTP protocol. This S-MIME certificate is used for both message signing and encryption.

XML Parsing/Validation

All services provided by a given integration framework installation (optionally) process a payload in the form of an XML document. The Integration Services component is responsible for parsing this payload, validating it against a DTD or XML Schema, and then making it available to the Business Logic for processing. The XML parsing provided by the Integration Services component must comply with the full XML processing specification as defined by the W3C.

ECMAScript Document Manipulation

In order for Business Logic written in ECMAScript to manipulate the XML payload, there must be a binding of this XML payload to the ECMAScript environment. The Integration Services component must provide this binding to enable scripted Business Logic access to payload content. This binding must provide full access to the entire XML document, and support all aspects of the W3C XML ECMAScript Document Object Model (DOM) as specified in appendix A.(http://www.w3.org/TR/2000/WD-DOM-Level-1-20000929/ecma-script-language-binding.html) As an alternative to the W3C ECMAScript a simplified method of manipulating XML via ECMAScript may be implemented.

XML Translation (XSLT)
Rules Based XML Processing

The prior methods of XML processing describe the procedural processing of XML documents. In the paradigm of the present invention, the XML document is treated as an object, operated on by the defined business logic. This procedural view of processing XML documents supports complete manipulation of the XML document, but may become unwieldy for less experienced business logic developers. To simplify processing of XML documents, the integration framework supports the notion of declarative, or rules based processing of XML documents. Well-formed XML documents follow a strict element hierarchy. As such, every element in this hierarchy can be uniquely addressed with a simple syntax.

Assumptions and Dependencies

The integration framework supports the distribution of processing components across machine boundaries. Scalability is achieved through the addition of inexpensive CPUs. As components are distributed across the customer's computing environment, the locations of these components are made known to the framework via the administration interface.

The integration framework requires network access, allowing in/out bound HTTP access, in order to support agent requests to/from remote sites.

Distributed Integration Framework components may not be split across TCP/IP firewall software/hardware.

Internal and external network bandwidth may affect integration framework performance.

Load distribution involves the equilateral distribution of processing (e.g. round robin), without consideration for independent processor loads (true load balancing).

Remote administration requires (secure) LDAP access through any external firewalls.

The integration framework supports both the UNIX and Win32 platforms.

The threading model specified for agent services must match the threading model support by the back end system API. This is to ensure that there are mechanisms in place to ensure secure, exclusive access to a back-end resource (e.g., to enable the writing of customer data to ERP fields that support order processing) while it is being used (e.g., to prevent over-writing of the same fields by another application that has access to the same ERP).

The integration framework adds system load to the installation machine, as such, care should be given before deciding to co-locate the framework with the back end application.

Load Distribution

The integration framework supports the distribution of processing elements across physical machine boundaries. This model supports configurations consisting of the default configuration of a single machine, up to many machines cooperating to provide for load distribution and fail over. The integration framework supports the physical separation of the network interface units from business logic processing units. The network interface units provide for network presence and load distribution, while the business logic processing units carry the actual processing load. The integration framework scalability model supports one or more network interface units, and one or more business logic processing units.

Each network interface unit supports one or more business logic processing units. As the load on any single business logic processing unit increases, additional business logic processing units can be brought on line. As the load on any single network interface unit increases, additional network interface units can be brought on line. The network interface unit supports the mapping of incoming SOAP requests to a specific set of (one or more) business logic processing units. SOAP requests not assigned to a specific (set of) machine(s) are routed in a weighted, round robin fashion.

Configuration Management

Each integration framework utilizes the LDAP protocol for configuration management. Each integration framework installation includes an LDAP server. Each component retrieves its configuration information from the local LDAP server. This allows for dynamic reconfiguration of integration framework components.

Logging/Diagnostics

The integration framework supports dynamic configuration of logging and diagnostic output. Through the administration application, the integration framework administrator can specify which events get logged, and the content and format of all log messages. The integration framework supports both textual and XML formatting of log messages. The integration framework supports logging to local disk, as well as remote logging to a log server. Specification of log rollover parameters is made via the administration application. Typical log messages include a date/time-stamp, trading partner identification, topic and payload and message. The integration framework supports the separation of diagnostic/error and transaction logging.

HTML/Servlet/JSP Services

The integration framework supports access to Services and Payload Processors via standard HTTP(S) POST and GET requests. This enables low-end users the ability to interact with one or more integration framework installations with a standard browser. Definition of the HTML UI is specified using a combination of static and dynamic HTML pages, leveraging standard Servlet and JSP services. The JSP Services also support the notion of what is commonly referred to as model-view-controller model 2 design pattern.

Administration

Each integration framework installation is remotely administered via the integration framework administration application. This application acts as a portal for administering one or more remote integration framework installations. The administration application presents a GUI view of a distributed network of integration framework installations. The administration application communicates with these remote integration framework installations via the SOAP protocol. By interacting with the administration application UI, the integration framework administrator can view, edit and save changes to the configuration and business logic associated with the remote integration framework.

Domain Administration

Domains are defined through the issuance of client digital certificates. Each client certificate specifies the domain within which this installation has permission to operate. During the client authorization process, the server verifies that the client does indeed belong to the appropriate domain prior to servicing the request.

Domains are also specified on the client certificates used by the remote administration application. This restricts the remote administration application to accessing only those integration framework installations for which they have been authorized.

Integration Framework Administration

Each integration framework installation is administered via the remote administration application. This application presents a graphical user interface for performing all administrative tasks on a remote integration framework installation. Tasks supported by the remote administration application include certificate management, overall configuration, Host Adapter installation, Host Adapter configuration, Agent/Service construction and configuration, network configuration, transaction log maintenance, remote execution tracing (monitoring), performance monitoring, load balancing etc.

When the administrator attempts to administer a given integration framework installation, the administrators client certificate is provided during the client authorization process. The server verifies that the client certificate is valid, and that it grants appropriate access permissions to the administrator. The integration framework utilizes a proprietary XML dialect for the data transfer required to support remote administration.

Installation and Administration

The integration framework is installed within the customer's environment either from a CD-ROM or downloaded from the integration framework provider's download site. Installation scripts guide the installer through the installation process, prompting for all necessary site-specific information. The components are installable on a single machine, or across multiple machines, based on the expected load requirements. The same installation script is executed on each machine, and the desired components installed. Once installation is complete, the administration user interface is presented for system configuration.

Administration functions will be accessible either locally, or remotely by centralized integration framework provider support personnel. Authentication is required to perform administration activities.

The standard configuration supports testing the successful installation of the integration framework. An administration user interface provides for the specification of the back end integration system(s), partner registration, agent scripting, and load distribution.

Application Integration Specification

The installation user interface provides the means for specifying which back end system(s) the user wishes to expose to its trading partners. Selection of these system(s) during installation results in the installation of the Host Adapters capable of interfacing with these systems and the Business Logic Processing Unit(s) capable of processing the data/events associated with these systems.

Partner Registration

Each partner to whom the customer wishes to expose his or her back end system is registered via the administration user interface. Partner registration is provided for the documentation and storage of the legal terms and conditions of the partnership, connection method, security model, and services exposed by each partner. Each incoming request is validated against this partner agreement prior to invocation. If the requested service is disallowed by the partner agreement, the request is denied at run time. Items defined within the partner agreement will include:

- The organizations and responsible individuals that are agreeing to transact business over the Internet
- The services to be used (security, authentication, communications, non-repudiation, audit logging, etc.)
- The rules to be enforced in handling document interchanges
- The business protocol to be used (such as SOAP, OBI, RosettaNet, cXML, or BizTalk)
- Message exchanges
- Message formats
- Recovery procedures Agent Scripting The administration interface provides access to the business logic, which is authored in ECMAScript and comprises each Business Logic Processing Unit. The business logic is viewable and editable to tailor the Integration Framework to a particular customer's needs.

Performance Requirements

The integration framework scales linearly with the addition of hardware and a reasonable distribution of processing components. The response times remain linear up to the point of network saturation.

The integration framework supports weighted load sharing as opposed to true load balancing. This can lead to a situation where bottlenecks occur as operational components become saturated. It is the responsibility of the framework administrator to monitor load and appropriately distribute the system components.

Other (Supplementary) Requirements

Applicable Standards

The following public, open standards are utilized and leveraged by the integration framework to communicate between components and to enhance interoperability with third party applications and systems.

- HTTP 1.0 and/or HTTP 1.1
- XML
- XML Schema
- XSLT
- XPath
- SOAP 1.1
- ECMAScript
- LDAP System Requirements The plethora of operating environments in existence today requires a platform independent solution. To this end, the integration framework is a pure Java application, limited only by the availability of a Java Runtime Environment (JRE) for the target platform. Certain supporting components may be platform dependent, but these will be lightweight and distributable such that they may be separated out and independently deployed on the required platform at minimal cost to the customer. For instance, the configuration component is deployed on an open source LDAP server that requires either a Solaris or Win32 platform. If neither of these platforms is available, a minimum configuration specific for this component may be installed, and accessed by the other components via the local area network.

While various application embodiments of the present invention have been described above, it should be understood that they have been presented by way of example only, and not limitation. Thus, the breadth and scope of the present invention should not be limited by any of the above-described exemplary embodiments.

The invention claimed is:

1. A distributed computer system for customization of process logic in an integrated system having multiple nodes, including dissimilar host computer systems each having an API and using different communications and data protocols, each node being independent of other nodes in said system, said system capable of handling standard markup language data, including XML documents, from different communication protocols regardless of the underlying protocol, comprising: at least two host computer systems, each host computer system having process logic, said process logic capable of integrating disparate systems having different communication protocols, wherein applications being integrated in said distributed computer system do not require additional code; whereby, each individual unit of process logic is a service, multiple services are grouped together to form an agent, and each said incoming standard markup language data is processed by each host computer system as a document object model (DOM); an interpreted, non-web-based scripting language not requiring compiling in said process logic nodes said non-web-based scripting language allowing for remote administration and customization of said process logic nodes whereby extensions to said scripting language are used to create, manipulate, and modify XML documents through rules-based, simple declarative extensions of said scripting language in the form of a custom language binding to XML document syntax to facilitate manipulating an XML payload in a manner that is native to said process logic nodes' implementation of said scripting language; business logic for mapping said declarative extensions of said scripting language between said dissimilar host systems; translation logic connected to said business logic for translating data formats and correlating events between said dissimilar host systems using said non-web-based scripting language for manipulation of the data formats; and a host adapter in which said host system API is in code accessible to said non-web-based scripting language utilized by said host computers.

2. The system as set forth in claim 1, wherein said scripting language is ECMAScript-262.

3. The system as set forth in claim 1, wherein said process logic is business logic.

4. The system as set forth in claim 1, wherein said communication protocols include TCP/IP, HTTP, SMTP, FTP, MOM, POP3, IMAP, SOAP and other known communication protocols.

5. The system as set forth in claim 3 wherein said business logic allows connection between agents using a variety of data formats and communications protocols, so that the system is communication protocol and data format agnostic.

6. The system as set forth in claim 5 wherein said agent management services allow at least one of installation and removal of agents.

7. The system as set forth in claim 1 wherein said host system supports at least one of browser-based applications using a standards track internet protocol and mail client applications using a mail transfer protocol to communicate with said host computer systems.

8. The system as set forth in claim 7 wherein said host computer systems are capable of sending and receiving object activation requests and messages utilizing an email retrieval protocol.

9. The system as set forth in claim 1 further including correlation logic for correlating events between one or more host computer systems.

10. The system as set forth in claim 1 further including integration logic for providing at least one non-application-specific service and integrating any application between one or more host computer systems, whereby said system allows remote administration without being on-site at a host system location.

11. The system of claim 7 wherein said standards track internet protocol is HTTP, said mail transfer protocol is SMTP, and said email retrieval protocol is at least one of POP3 and IMAP servers.

12. The system of claim 1 wherein said one or more host computer systems comprise at least two integration services.

13. The system of claim 1 wherein said host systems are capable of sending and receiving object activation requests and messages using POP3 and IMAP servers.

14. The system of claim 1 wherein non-application-specific services are supported.

15. The system of claim 1 wherein said administration uses identification.

16. The system of claim 1 wherein each said incoming standard markup language data document, regardless of the data format, is processed by each host computer system as a document object model (DOM).

17. The system of claim 1 wherein said one or more host computer systems APIs are in code accessible to said non-web-based scripting language.

18. A distributed computer system for customization of process logic in an integrated system having multiple nodes, including dissimilar host computer systems, each said host computer system having an API and using different communications protocols, each node being independent of other nodes in said system, said distributed computer system capable of handling standard markup language data, including XML documents, from different communication protocols regardless of the underlying protocol, comprising: at least two host computer systems using payload processors, each host computer system having business logic capable of integrating disparate computer systems regardless of the underlying communication protocol of each host computer system and capable of handling standard markup language data from different data formats; said payload processors' business logic are tied to predefined elements within said incoming standard markup language data document and processed by said host computers using an event based model; an ECMAScripting language in which said business logic nodes in said host computers operate, whereby extensions to said ECMAScripting language are used to create, manipulate, and modify XML documents through rules-based, simple declarative extensions of said scripting language in the form of a custom language binding to XML document syntax to facilitate manipulating an XML payload in a manner that is native to said business logic nodes' implementation of said scripting language; said business logic capable of mapping said declarative extensions of said ECMAScripting language between said dissimilar host systems; translation logic coupled to said business logic for translating data formats and correlating events between said dissimilar host systems using said ECMAScripting language for manipulation of the data formats; and said ECMAScripting language allowing for remote administration and customization of said business logic nodes in said host computers, said host system API is in code accessible to said ECMAScripting language utilized by said host computers.

* * * * *